United States Patent
Hahn et al.

(10) Patent No.: US 9,478,115 B2
(45) Date of Patent: Oct. 25, 2016

(54) OPERATOR SYSTEM FOR A MACHINE

(71) Applicant: KRONES AG, Neutraubling (DE)

(72) Inventors: Wolfgang Hahn, Neutraubling (DE);
Timo Pronold, Neutraubling (DE);
Johannes Böhm, Neutraubling (DE);
Christina Traub, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/428,214

(22) PCT Filed: Sep. 13, 2013

(86) PCT No.: PCT/EP2013/068970
§ 371 (c)(1),
(2) Date: Mar. 13, 2015

(87) PCT Pub. No.: WO2014/048765
PCT Pub. Date: Apr. 3, 2014

(65) Prior Publication Data
US 2015/0248826 A1    Sep. 3, 2015

(30) Foreign Application Priority Data
Sep. 27, 2012 (DE) .................. 10 2012 217 573

(51) Int. Cl.
*G08B 21/18* (2006.01)
*G02B 27/01* (2006.01)
*G05B 19/409* (2006.01)

(52) U.S. Cl.
CPC ............ *G08B 21/18* (2013.01); *G02B 27/017* (2013.01); *G05B 19/409* (2013.01); *G02B 2027/0178* (2013.01); *G05B 2219/23148* (2013.01); *G05B 2219/24012* (2013.01); *G05B 2219/32014* (2013.01); *G05B 2219/35482* (2013.01)

(58) Field of Classification Search
CPC .............................. G08B 21/187; G08B 21/18
USPC .................................................. 340/679, 380
See application file for complete search history.

(56) References Cited

U.S. PATENT DOCUMENTS

| 2005/0254665 | A1* | 11/2005 | Vaudrey ............. G10K 11/1788 381/72 |
| 2012/0212499 | A1 | 8/2012 | Haddick et al. |
| 2012/0235896 | A1* | 9/2012 | Jacobsen ................. G06F 3/011 345/156 |
| 2013/0038692 | A1* | 2/2013 | Ohtomo ............... G05D 1/0038 348/46 |
| 2013/0278631 | A1* | 10/2013 | Border ................. G02B 27/017 345/633 |

FOREIGN PATENT DOCUMENTS

| DE | 10063089 C1 | 7/2002 |
| DE | 102005045855 A1 | 3/2007 |
| EP | 2380709 A2 | 10/2011 |
| WO | WO-2008/127316 A1 | 10/2008 |
| WO | WO-2011/154072 A1 | 12/2011 |

OTHER PUBLICATIONS

International Search Report for Application No. PCT/EP2013/068970, dated Jan. 16, 2014.
German Search Report for Application No. 102012217573.3, dated Apr. 8, 2013.

* cited by examiner

*Primary Examiner* — Kevin Kim
(74) *Attorney, Agent, or Firm* — Marshall, Gerstein & Borun LLP

(57) ABSTRACT

An operator system for a machine, in particular for a beverage processing machine, the system comprising a mobile operator device for the machine, a signal emitter for reporting alarm and/or warning signals and safely glasses for protecting the eyes of a user. The safety glasses have a display system that is designed in particular as a head-mounted display, or a virtual retina display, or a projector and the operator device and/or the signal emitter and/or the safety glasses have a respective data transmitter for exchanging machine information and/or alarm and/or warning signals.

14 Claims, 3 Drawing Sheets

OPERATOR SYSTEM FOR A MACHINE

CROSS-REFERENCE TO RELATED APPLICATION

The present application is the US national phase of International Patent Application No. PCT/EP2013/068970, filed Sep. 13, 2013, which application claims priority to German Application No. 102012217573.3, filed Sep. 27, 2012. The priority application, DE 102012217573.3, is hereby incorporated by reference.

FIELD OF THE DISCLOSURE

The invention relates to an operator system for a machine, in particular for a beverage processing machine, to a mobile operator device, a signal generator and safety glasses.

BACKGROUND

Typically, a user of beverage processing systems operates the individual machines by an operator system. The operator system can be used, for instance, to initiate single processes in the machine, adjust parameters and/or receive alarm or warning signals. To this end, stationary operator devices, and increasingly also mobile operator devices are used. The mobile operator devices are compatible with the entire system, respectively, can be used for different machines. The user can carry a mobile operator device with him to the respective machine and carry out, or monitor, functions of other machines at the same time.

For instance, the user places the mobile operator device down in the area of a certain machine, and can keep an eye on the display of the mobile operator device during operating processes or also repairs for reading information therefrom. Also, he is able to control individual machine components with the operator device so as to carry out operating processes or repairs. In addition, alarm or warning signals from this and/or other machines are signaled to the user, and he can thus decide whether an urgent operating process or the repair of another machine should be given preference.

Operator systems including mobile operator devices of this type often prove to be non-ergonomic in practice since they are attached to the body or received in pockets or holding devices and are, thus, not constantly visible. If the user then takes the operator device into one of his hands, this hand is no longer available to carry out operating processes, repairs, maintenance works and/or setting up processes on the machine. At the same time, the user always has to avert his gaze from the machine component to be operated/repaired, to read the display of the operator device.

Also known are access authorization systems for which the user carries along a so-called "token". These are electronic keys which can be read out by the machine using a reading device and, upon the successful identification, the user is given corresponding access rights. Systems of this type have the disadvantage that, on the one hand, the user has to carry the "token" with him. Also this "token" could be misused in case of loss. Moreover, each machine requires a cost-intensive reader to read the token. An augmented reality system is known from DE 100 63 089. The user of this system is displayed information on a head-mounted display of his goggles when servicing the machine. On the one hand, the user sees the area of the machine to be repaired, and superimposed virtual information, on the other hand. Accordingly, he need not avert his gaze to the display whilst working.

Another augmented reality system is known from DE 10 2005 045 855, by means of which the position of the user's head is located. The user is then displayed information on his head-mounted display so as to exactly position a sensor in the machine.

Augmented reality systems of this type have the disadvantage that an activation of the user is merely accomplished by visual signals which can be easily overlooked. This may be the case, for instance, if the user is concentrated on a specific activity/task. In addition, systems of this type do not provide enough work protection.

The present invention is based on the object to provide an operator system for a machine, which is ergonomic with regard to the handling thereof and offers sufficient work protection.

The object is achieved by an operator system according to claim 1, according to which the operator system for a machine, in particular for a beverage processing machine, comprises a mobile operator device for the machine, a signal generator for reporting alarm and/or warning signals, and safety glasses for protecting the eyes of a user, wherein the safety glasses comprise a display system that is configured in particular as a head-mounted display, or a virtual retina display, or a projector, and wherein the operator device and/or the signal generator and/or the safety glasses each comprise a data transmitter for exchanging machine information and/or alarm and/or warning signals.

Due to the fact that the safety glasses comprise a display system, the eyes of the user are, on one hand, protected from dangerous foreign objects. On the other hand, work-supporting information are directly loaded into his safety glasses. For instance, the tightening torque for a screw can thus be displayed to him as he tightens the screw with a torque wrench. Also, he may be displayed information about the system status, such as temperatures or flow rates. At the same time, the user has both hands free in order to carry out repairs. In addition, it may be indicated to the user both in the display system and by means of the signal generator whether alarms or warnings from the machine or other machines exist. The signal generator allows the alarm and/or warning signals to be displayed by the display system independently of the optical stimulus, so that these signals cannot be overlooked by the user. Due to the fact that the operator device and/or the signal generator and/or the safety glasses each comprise a data transmitter both data for the display of information and alarm and/or warning signals can be exchanged between these units in an easy manner.

The operator system may be configured for operating and/or maintaining the machine, several machines, an entire plant and/or several plants. The operator system according to the invention thus supports the user during the operation and/or maintenance from an ergonomic point of view and, at the same time, protects the eyes of the user from dangerous foreign objects.

The machine may be arranged in a beverage processing plant. The machine may comprise a computer-based machine controller. The machine may be a beverage processing machine and/or a container treatment machine which, in particular, is a stretch a blow molding machine, a rinser, a filler, a closer, a labeler and/or a packaging machine, or another beverage processing machine and/or another container treatment machine.

The mobile operator device may comprise a microprocessor, a keyboard and/or a display which is, in particular, touch-sensitive. Also, the mobile operator device may comprise individual control knobs. The mobile operator device may be a tablet computer or a smart phone.

The signal generator may comprise a wristband, a chain to be hung around one's neck, a clip and/or a fastener to be fastened to an article of clothing and/or part of the user's body. The signal generator may also be integrated in the safety glasses or be fixed to headgear. Thus, the user can be activated by a vibration signal on the head, or by a visual signal at/in front of the eyes. The signal generator may comprise a microprocessor and/or a battery for the power supply.

The safety glasses may be configured for protection from mechanical, thermal, chemical, biological, electrical and/or optical risks. The safety glasses may be constructed in accordance with legal work protection standards.

The display system may be configured as a head-mounted display (HMD). In the head-mounted display an imaging optics may be arranged in front of the eye to generate a virtual image of a display in front of the eye of the user. The imaging optics of the head-mounted display may be configured semipermeable, in particular, wherein the user can see a superposition of the environment with the information of the display. Alternatively, the display system may be configured as a virtual retina display, in which case an image is directly projected onto the retina of the eye. The virtual retina display may comprise a laser. Also, the display system may be designed as a projector by means of which the information is projected onto a surface outside the safety glasses. The projector may comprise a laser and a scanning unit. Thus, by the deflection of the laser, an image can be directly projected onto the environment. Also, the projector may be designed as a miniature projector, wherein in particular a display is illuminated by an LED and imaged by an optics. The display of the head-mounted display, respectively, projector may be an LCD, DLP or LcoS.

The data transmitter may be configured to transmit data between the respective units by cable, glass fiber, or wirelessly via radio. In particular, the data transmitter may comprise a WLAN or Bluetooth interface. The data transmitter may comprise a receiver unit and/or a transmit unit.

In the operator system, the safety glasses may comprise a talk-listen unit which, in particular, is connected to the data transmitter of the safety glasses for transmitting speech information. Thus, the user is able to talk to colleagues while working, for instance, to obtain advice or pass on information about the progress of the work. Due to the fact that the talk-listen unit is connected to the data transmitter of the safety glasses for transmitting speech information same does not require an own transmission interface. The system furthermore allows that the user can view documents about the display system submitted by colleagues and, at the same time, discuss them with the colleagues. The talk-listen unit may comprise a loudspeaker or earphone, and a microphone. The earphone may be designed as an in-ear earphone.

The operator system can comprise safety glasses provided with a hearing protector for suppressing disturbing ambient noise which, in particular, works with an active sound suppression. Thus, the user does not need a separate hearing protector, which could cause a sensation of pressure on the head if the safety glasses are worn simultaneously. The hearing protector is able to suppress ambient noise which is too loud. The active sound suppression allows the generation of an acoustic counter-signal, so that disturbing ambient noise is extinguished in the ear by interference. This allow a particularly good suppression of disturbing ambient noise.

In the operator system, the talk-listen unit may be integrated in the hearing protector. This allows the use of existing systems of the talk unit for the hearing protector.

The earphone of the talk-listen unit may be sealed to suppress disturbing ambient noise. Also, the microphone and the earphone from the talk-listen unit may be used for the active sound suppression. Thus, the user can use the talk unit for communicating with other colleagues and, at the same time, is protected from disturbing ambient noise.

In the operator system, the safety glasses may comprise a first camera for detecting objects in the field of vision of the user. The images detected by the first camera can be transmitted by the data transmitter for being stored and/or for the communication with colleagues. Thus, colleagues of the user are able to directly see the field of vision of the user, and support him in servicing the system. Moreover, the image of the surroundings of the first camera can be displayed to the user by the display system, in particular if the safety glasses are not transparent. The first camera may be designed as a CCD or CMOS camera with a lens. The operator system may comprise an image evaluation unit which, in particular, is configured to automatically identify objects in the image data. Thus, information concerning the objects present in the field of vision can be automatically displayed to the user in the display system of the safety glasses.

The operator system may comprise a gesture identification unit for processing gestures of the user to machine commands. Thus, the user is able to issue, with his hands, commands to the operator system by means of gestures in a contactless manner. This further facilitates the operation. The gesture identification unit may be configured to evaluate the image data of the first camera. The first camera may include an image detection zone which also detects the user's hands. Thus, gestures of the user made with his hands can be filmed by the first camera and processed to machine commands by the gesture identification unit. This allows a particularly easy operation of the operator system.

The operator system may comprise a locating system for detecting the position and/or orientation of the safety glasses which, in particular, is at least partially arranged on the safety glasses. The locating system may comprise acceleration sensors and/or position sensors. Also, the locating system can comprise a tracking system, and markers which are recognizable in particular by the tracking system. The tracking system can be in a fixed relationship with the machine, and the markers may be provided on the safety glasses. It is also possible that the tracking system is provided on the safety glasses, and the markers on the machine, whereby in particular the first camera records the markers as image data. Thus, it is possible to detect the position of the safety glasses and, thus, the field of vision of the user relative to the machine and, accordingly, only information relating to objects in the field of vision can be displayed to the user. Moreover, it is possible that the locating system determines the location of the user in the entire plant. Thus, the user can be located by his colleagues particularly easily. The detection of the position and/or the orientation of the safety glasses can be accomplished relative to the machine.

In the operator system, the safety glasses can comprise a second camera, which is configured to detect at least one eye of the user. Thus, the viewing direction of the user can be detected particularly easily. Correspondingly, the representation of the information in the display system can be adapted to the viewing direction of the user even more finely.

The operator system may comprise a biometric identification unit for identifying the user in order to issue an access authorization, in particular, wherein the biometric identification unit is configured to evaluate image data of an eye of the user. This allows the unique identification of the user, and the access to the machine can thus be controlled in a particularly secure manner. Moreover, the machine need not comprise an own receiver for an electronic key (token) to allow the access authorization. The second camera can generate image data of the eye of the user and transmit them to the biometric identification unit. The second camera can be connected to the biometric identification unit by the data transmitter.

The signal generator can be attached to the body of the user or to the safety glasses. The signal generator does thus not disturb the user at work. The integration into the safety glasses allows the user a particularly good perception of the signal generator.

The signal generator may comprise a vibrator, an acoustic and/or visual signal generator. The vibrator gives the user an activation stimulus which he can sense regardless of the sound volume in the environment. The same can be achieved by the visual signal generator. In addition, the user's attention may be drawn to the alarm and/or warning signals by the acoustic signal generator if he has no direct visual contact with the signal generator. The signal generator can provide different types of alarm and/or warning signals in the form of differently coded vibration, sound and/or light signals. The different codings may have different intensities or rhythms. The visual signal generator can display different types of alarm and/or warning signals in different colors. The visual signal generator may comprise a display.

In the operator system, the display system may be configured to present a different image to each eye of the user, in particular, to display 3D information. 3D information may be three-dimensional information. Thus, the information can appear to the user virtually in space. The user can thus distinguish between the information in a particularly easy manner.

In the operator system, the display system may be configured to display virtual operator devices to the user. The user can thus operate the virtual operator devices by means of gestures and, thus, alter the parameters of the machine in a particularly easy manner. In addition, the information is displayed to the user in a particularly ergonomic manner.

The operator system may be configured for a data transfer with an external service station, in particular for the remote diagnostic and/or maintenance. The external service station may be arranged in a service center on the plant grounds, or at a manufacturer of the machine. The external service station may be a computer including a service software. The data transmitter may be configured for the data transfer. In the data transfer image and sound data may be transmitted, in particular data for the display system, for the listen-talk unit, from the first camera, from the second camera and/or from the locating system. The remote diagnostic and/or maintenance allows the direct communication between the user and an expert in a service station, e.g. at the manufacturer.

The operator system may comprise a separate camera, and the display system may be configured to represent the image of the separate camera on call or request from the user. The separate camera may be configured to record conditions at single points of the machine. Thus, it would be conceivable that the filling conditions of preform containers, fastener containers, label containers or other containers is displayed, or also that critical plant sites are displayed which are more frequently subject to malfunctions or other problems. The separate camera may be designed to be mobile, so that the position thereof can be changed any time.

Additional features and advantages of the invention will be explained below by means of the exemplary figures. In the figures:

DETAILED DESCRIPTION OF THE PREFERRED EMBODIMENTS

Figure 1:
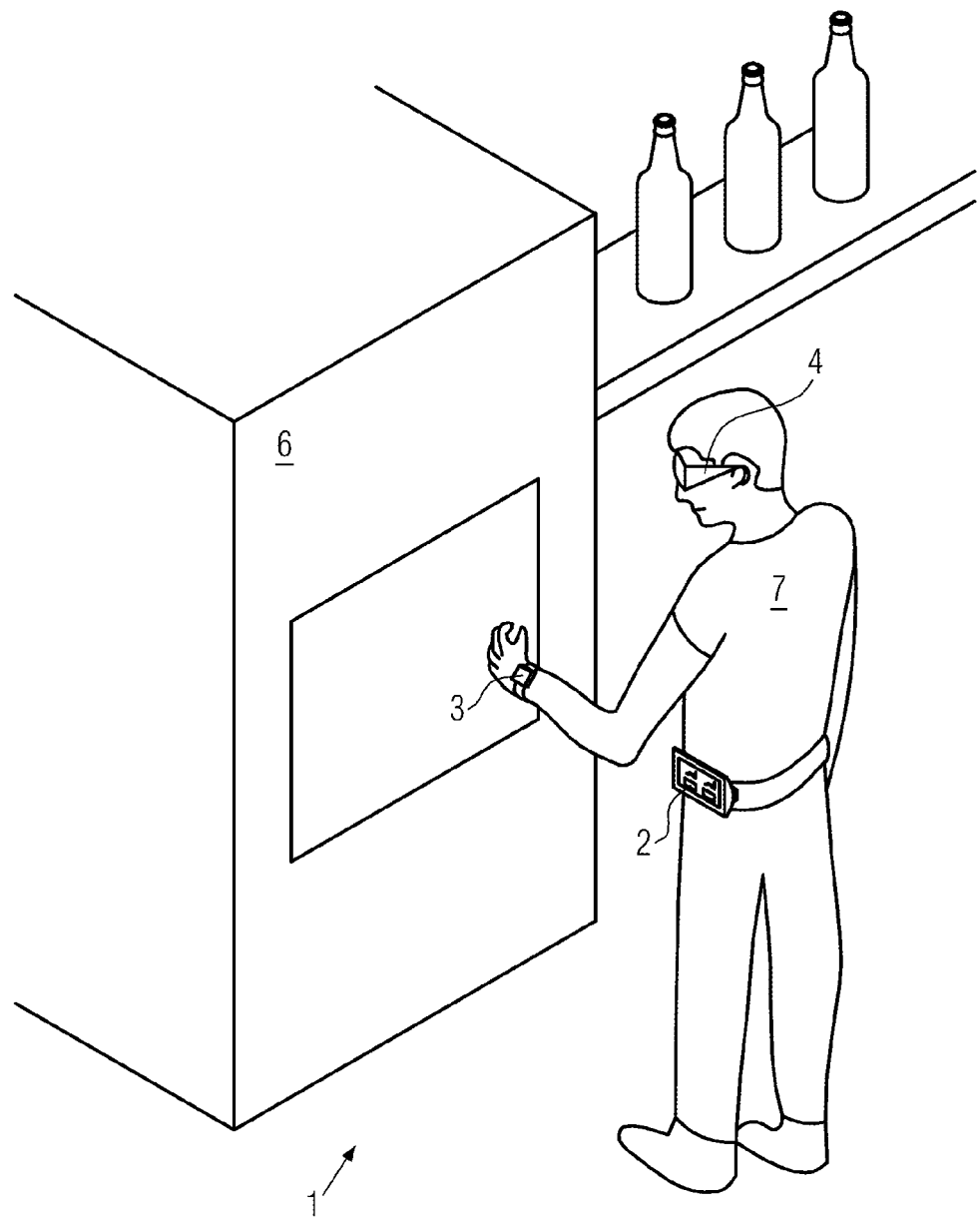
FIG. 1 shows a perspective view of an operator system according to the invention.

FIG. 1 shows a perspective view of an operator system 1 according to the invention. It can be seen that a user 7 is standing in front of a machine 6 for operating or maintaining same. The illustrated machine 6 is, in this case, a beverage processing machine.

The user 7 wears a belt on which a mobile operator device 2 is attached. At the same time, the user 7 wears safety glasses 4 which comprise a display system configured as a head-mounted display. Via same, information are displayed to the user 7 in his field of vision. On his left arm the user 7 wears a signal generator 3. The signal generator 3 includes a vibrator as well as an acoustic and a visual signal generator, by means of which different alarm and/or warning signals can be transmitted to the user 7 independently of the display system in the safety glasses 4. This reduces the likeliness that the user 7 does not perceive these signals.

While servicing or operating the machine 6 the user 7 has both of his hands free to carry out manual activities. At the same time, the user 7 is displayed corresponding information about the status of the machine 6 by the display system in the safety glasses 4. It is also possible that documentations of the machine 6 are displayed to the user 7 by the display system on the basis of which he can carry out the service. Also, the display system displays virtual operator devices to the user 7 on which he can adjust parameters of the machine 6.

Figure 2:
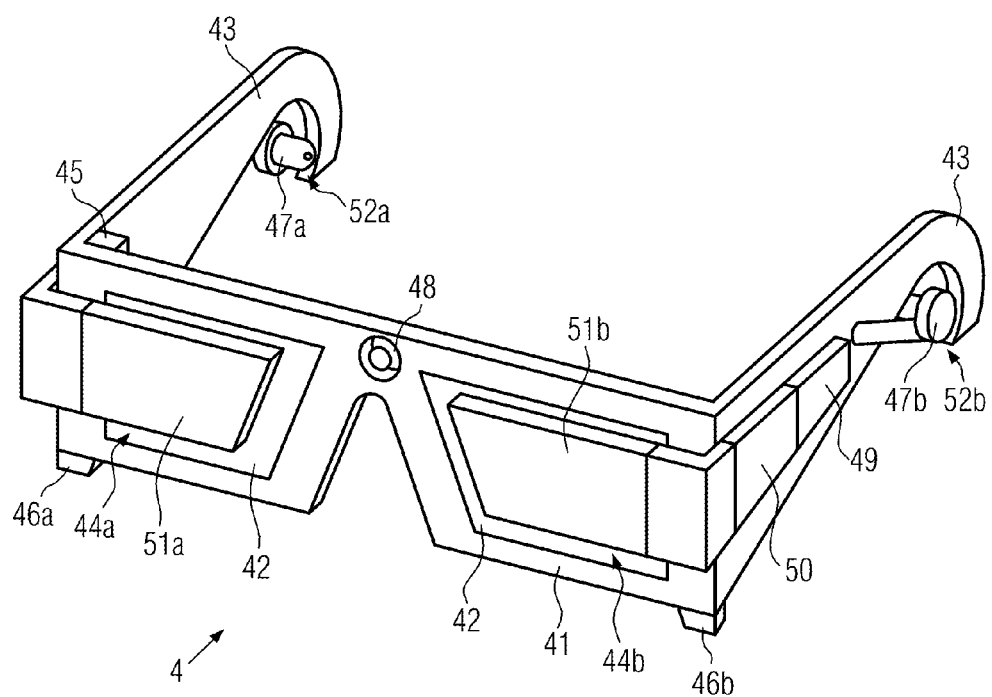
FIG. 2 shows a perspective view of the safety glasses of the operator system according to the invention of FIG. 1.

FIG. 2 shows a perspective view of the safety glasses 4 of the operator system 1 according to the invention of FIG. 1. It illustrates a spectacle frame 41 into which two safety lenses 42 are inserted. The safety glasses 4 furthermore comprise two temples 43 worn above the ears of the user 7.

In front of each of the eyeglass lenses 42 of the safety glasses 4 display systems 44a, 44b are respectively arranged, which are each designed as a head-mounted display 51a, 51b. The head-mounted displays 51a, 51b include optical systems by means of which different images from LCD displays are displayed to each eye of the user 7. The head-mounted displays 51a, 51b are semipermeable (semi-transparent), so that the user 7 can simultaneously see the surroundings of the safety glasses 4. The display systems 44a, 44b are able to display different images to each eye of the user 7, permitting him to also view three-dimensional information. Consequently, the user 7 can see, on the one hand, the surroundings through the safety glasses 4 and, on the other hand, virtual information superimposed with same.

Similar to a legend in a drawing the user 7 is displayed, for instance, the tightening torque for a screw located in the field of vision and/or the tool type suited therefor.

The safety glasses 4 furthermore comprise a listen-talk unit 46a, 46b, 47a, 47b, which is configured as a hearing protector 52a, 52b. The earphones 47a, 47b for each ear are designed as plugs (in-ear earphones), so that they seal the auditory canal. Thus, disturbing ambient noise is suppressed and cannot penetrate the auditory canal. At the same time, the microphones 46a, 46b externally sense the disturbing ambient noise and additionally emit a compensation signal through the earphones 47a, 47b, so that the remaining ambient noise is further reduced. In addition, wanted signals, e.g. human voices, are sensed by the microphones 46a, 46b and filtered out by a filtering unit (not shown) and played in, to the user 7, through the earphones 47a, 47b isolated from the ambient noise. Thus, it is possible for the user 7 to communicate with the colleagues on site. In addition, the illustrated listen-talk unit 46a, 46b, 47a, 47b may be used as a telephone device in connection with a cellular phone or other units of the operator system 1, for instance, in order to speak to colleagues not being on site. The listen-talk unit 46a, 46b, 47a, 47b may be connected to external units by the data transmitter 50, in particular for transmitting speech data.

Also, a data transmitter 50 is illustrated, which is configured as a wireless radio interface. The radio interface may be a WLAN interface or Bluetooth interface. By the data transmitter 50 the safety glasses 4 are in communication with the mobile operator device 2 of FIG. 1. Also, the safety glasses 4 may be connected to the signal generator 3 of FIG. 1. This connection allows an exchange of data between the units.

The safety glasses 4 furthermore comprise a first camera 48 which points to the front and captures the field of vision of the user 7. The first camera 48 generates image data of the environment directly in front of the user 7. These image data can directly be forwarded by the data transmitter 50 to colleagues, allowing them to support the user 7 during the service. The first camera 48 furthermore captures the hands of the user 7 so as to record his gestures as image sequences. The so obtained images can be transmitted by the data transmitter 50 to the mobile operator device 2 for analyzing the gestures. Also, it is possible to automatically detect objects in the field of vision of the user 7 in the image data.

The safety glasses 4 additionally comprise a second camera 45 which is directed to one eye of the user 7. Image data from the second camera 45 are passed on by the data transmitter 50 to the mobile operator device 2 where they serve to analyze the viewing direction and identify the user 7 on the basis of biometric identification features.

The safety glasses 4 additionally comprise a locating sensor 49 by means of which the location and position of the safety glasses 4 can be determined. The locating system 49 includes several acceleration sensors and position sensors, allowing the orientation and position of the head of the user 7 relative to the machine 1 to be determined, for instance to display, by the display system 44a, 44b, corresponding orientation information, towards which certain machine elements have to be positioned.

The safety glasses 4 furthermore comprise a microprocessor as a control unit and a battery for the power supply (not shown).

Figure 3:
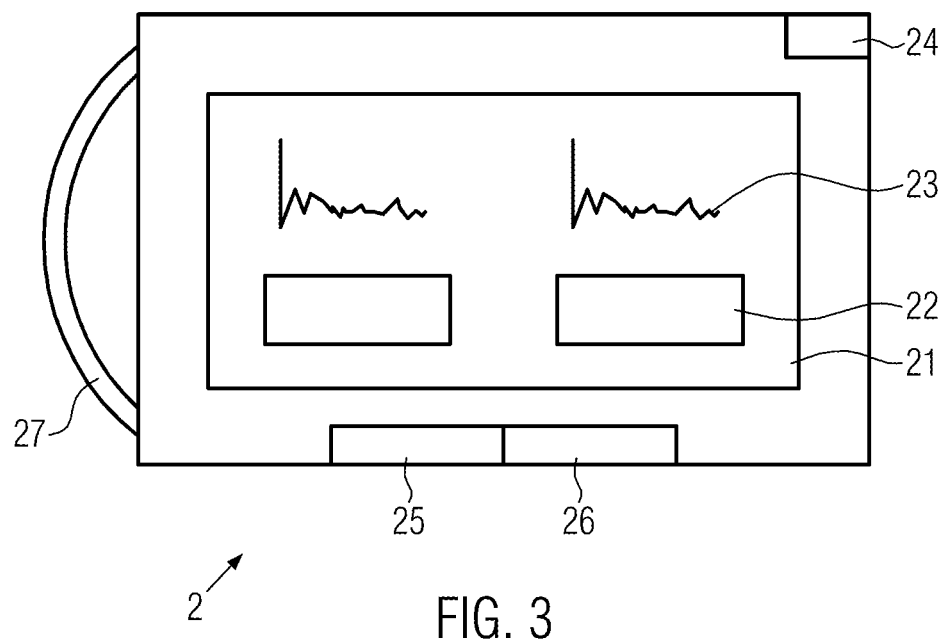
FIG. 3 shows a front view of the mobile operator device for the machine of the operator system according to the invention of FIG. 1.

FIG. 3 shows a front view of the mobile operator device of the operator system 1 according to the invention of FIG. 1. It shows a touch-sensitive display 21 with a handle 27, on which menu elements 22 and information 23 are displayed, by means of which the user 7 can operate the machine 6 in the usual manner. The mobile operator device 2 also comprises a clip on the backside (not shown) allowing it to be fastened to the belt of the user 7.

FIG. 3 also shows a data transmitter 24 having a data transmission standard (e.g. Bluetooth), which is compatible with the data transmitters 50, 34 in the safety glasses 4, respectively, signal generator 3. Data are here transmitted wirelessly and exchanged between the operator device 2, the signal generator 3, respectively, the safety glasses 4. In addition, a gesture identification unit 25 is recognizable, which is connected by the data transmitter 24, 50 to the first camera 48. As the latter records the hands of the user 7 and sends the images to the gesture identification unit 25, these can now be analyzed by image processing algorithms. If corresponding gestures of the user 7 are identified they are translated, as machine commands, and outputted. These machine commands are codes which are assigned to the different gestures. For instance, such a machine command may have the meaning that the machine 6 pushes the beverages slightly forward.

Also, the biometric identification unit 26 is shown, which is likewise integrated in the mobile operator device 2. The image data of the second camera 45 are transmitted by the data transmitter 50, 24 from the safety glasses 4 to the biometric identification unit 26 where they are analyzed. Corresponding biometric identification algorithms then filter corresponding individual identification features of the user 7 out of the image data, and the user 7 is uniquely identified on the basis of same. For instance, the iris of the user's eye is analyzed and identified. If the user 7 is authorized he will receive corresponding access rights to the mobile operator device 2, respectively, machine 6. If the safety glasses 4 are worn by a non-authorized user 7 access rights will be refused to him, and an alarm will be triggered.

Figure 4:
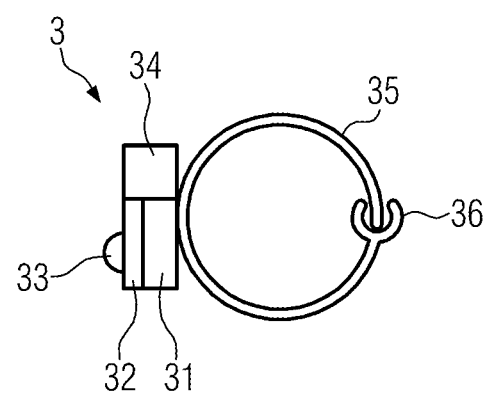
FIG. 4 shows a lateral view of a signal generator of the operator system according to the invention of FIG. 1.

FIG. 4 shows a lateral view of the signal generator 3 of the operator system 1 according to the invention of FIG. 1. It shows the signal generator 3 with a connection loop 35 provided on same for the attachment thereof on the wrist of the user 7. The connection loop 35 comprises a closing mechanism 36. In addition, the signal generator 3 comprises a data transmitter 34 for receiving data from the data transmitter 24 of the mobile operator device 2. Alarm and warning signals can here be transmitted from the operator device 2 to the signal generator 3 via radio. The signal generator 3 furthermore comprises a vibrator 31, an acoustic signal generator 32 and a visual signal generator 33. Thus, the alarm and warning signals can be transmitted to the user 7 in a particularly broad spectrum of activation stimuli. It is also possible, however, that the signal generator 3 only includes one of the three aforementioned possibilities. The signal generator 3 is particularly light, with an ergonomic design. Moreover, the signal generator 3 includes a battery and a microprocessor for processing the alarm and warning signals.

In the operator system 1 according to the invention, illustrated in FIGS. 1 to 4, the user 7 is thus supported particularly ergonomically in his servicing the machine 6. In doing so, he need not avert his gaze from the presently carried out activity so as to receive information on the machine status. At the same time, he is able to communicate with colleagues through the listen-talk unit, and view corresponding documents by the display system. At the same time, the unique identification of the user 7 is possible by the second camera 45 on the safety glasses 4 and the biometric identification unit 26 so as to grant the user 7 a corresponding access authorization to the machine 6. Moreover, the user 7 is reliably informed by the signal generator 3 if alarm or warning conditions occur.

It will be appreciated that the features mentioned in the above-described exemplary embodiments are not restricted to special combinations, but are practicable also in any other combinations.

The invention claimed is:

1. A system having a beverage processing machine and an operator system for the beverage processing machine, comprising:
   a mobile operator device including means for at least one of operating or maintaining the beverage processing machine;
   a signal generator separate from the mobile operating device for reporting at least one of alarm signals or warning signals, and
   safety glasses constructed in accordance with legal work protection standards and configured for protecting the eyes of a user from at least one of mechanical, thermal, chemical, biological, electrical or optical risks;
   wherein the safety glasses comprise a display system that is configured as one of a head-mounted display, a virtual retina display, or a projector; and
   wherein one or more of the operator device, the signal generator or the safety glasses comprises a data transmitter for exchanging at least one of machine information, alarm signals, or warning signals.

2. The system according to claim 1, wherein the safety glasses comprise a talk-listen unit which is connected to the data transmitter of the safety glasses for transmitting speech information.

3. The system according to claim 2, wherein the safety glasses comprise a hearing protector for suppressing disturbing ambient noise which works with an active sound suppression.

4. The system according to claim 3, wherein the talk-listen unit is integrated in the hearing protector.

5. The system according to claim 1, wherein the safety glasses comprise a first camera for detecting objects in a field of vision of the user.

6. The system according to claim 1, wherein the operator system comprises a gesture identification unit for processing gestures of the user to machine commands.

7. The system according to claim 1, wherein the operator system comprises a locating system for detecting at least one of the position or orientation of the safety glasses which locating system is at least partially arranged on the safety glasses.

8. The system according claim 5, wherein the safety glasses comprise a second camera, which is configured to detect at least one eye of the user.

9. The system according to claim 1, wherein the operator system comprises a biometric identification unit for identifying the user in order to issue an access authorization wherein the biometric identification unit is configured to evaluate image data of an eye of the user.

10. The system according to claim 1, wherein the signal generator is attached to at least one of the body of the user or to the safety glasses.

11. The system according to claim 1, wherein the display system is configured to present a different image to each eye of the user to display 3D information.

12. The system according to claim 1, wherein the display system is configured to display virtual operator devices to the user.

13. The system according to claim 1, wherein the operator system comprises a separate camera, and the display system is configured to present an image recorded by the separate camera on call or request from the user.

14. A system having a beverage processing machine and an operator system for the beverage processing machine, comprising:
   a mobile operator device including means for at least one of operating or maintaining the beverage processing machine;
   a signal generator separate from the mobile operating device for reporting at least one of alarm signals or warning signals, and
   safety glasses for protecting the eyes of a user; and
   wherein one or more of the operator device, the signal generator or the safety glasses comprises a data transmitter for exchanging at least one of machine information, alarm signals, or warning signals; and
   wherein the signal generator includes at least one of a group including a wristband, a chain to be hung around a user's neck, a clip, and a fastener to be fastened to at least one of an article of clothing or a part of the user's body.

* * * * *